US012784428B2

(12) United States Patent
Lim et al.

(10) Patent No.: US 12,784,428 B2
(45) Date of Patent: Nov. 3, 2026

(54) METHOD AND APPARATUS FOR GENERATING 3D GROUND TRUTH

(71) Applicants: Hyundai Motor Company, Seoul (KR); Kia Corporation, Seoul (KR)

(72) Inventors: Hyun Kyu Lim, Gwacheon-Si (KR); Jae Ha Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 236 days.

(21) Appl. No.: 18/648,879

(22) Filed: Apr. 29, 2024

(65) Prior Publication Data

US 2025/0095346 A1 Mar. 20, 2025

(30) Foreign Application Priority Data

Sep. 15, 2023 (KR) ........................ 10-2023-0123364

(51) Int. Cl.
*G06K 9/00* (2022.01)
*G06T 7/73* (2017.01)
*G06V 10/80* (2022.01)
*G06V 20/58* (2022.01)

(52) U.S. Cl.
CPC .............. *G06V 10/803* (2022.01); *G06T 7/74* (2017.01); *G06V 20/58* (2022.01); *G06T 2207/10028* (2013.01); *G06T 2207/30252* (2013.01)

(58) Field of Classification Search
CPC . G06T 2207/10028; G06T 2207/30252; G06T 7/74; G06T 7/30; G06T 3/06; G06T 7/73; G06T 17/00; G06T 2210/12; G06V 10/803; G06V 20/58; G06V 20/56; G01S 17/894
See application file for complete search history.

(56) References Cited

U.S. PATENT DOCUMENTS

2021/0080583 A1* 3/2021 Van Fleet ................. G06T 1/20
2021/0209341 A1* 7/2021 Ye ............................. G06T 7/73
2023/0131284 A1* 4/2023 Lim ....................... G06V 20/64
382/103

* cited by examiner

*Primary Examiner* — Duy M Dang
(74) *Attorney, Agent, or Firm* — Banner & Witcoff, Ltd.

(57) ABSTRACT

Disclosed are a method and apparatus for generating a three-dimensional (3D) ground truth (GT). The method includes obtaining 3D GT of a target object by using data obtained by a lidar, obtaining a 2D box for the obtained 3D GT by projecting the obtained 3D GT onto a 2D plane, comparing the 2D box with a box of a 2D GT for the target object obtained by a camera, and generating a final 3D GT for the target object by correcting the obtained 3D GT based on a comparison result.

20 Claims, 8 Drawing Sheets

(a)

(b)

$$x^{t+1}=x^{t}-\frac{f(x^{t})}{f'(x^{t})}$$

(a)

$$y_{i+1}=y_{i}+f(t_{i},y_{i})h$$

(b)

METHOD AND APPARATUS FOR GENERATING 3D GROUND TRUTH

CROSS-REFERENCE TO RELATED APPLICATION

This application claims the benefit of priority to Korean Patent Application No. 10-2023-0123364, filed in the Korean Intellectual Property Office on Sep. 15, 2023, the entire contents of which are incorporated herein by reference.

TECHNICAL FIELD

The present disclosure relates to a technology for generating three-dimensional (3D) ground truth (GT), and more particularly, to a method and apparatus for generating a 3D GT capable of generating high-quality 3D GT by adjusting the synchronization of data obtained by a lidar and a camera.

BACKGROUND

Reliability verification is very important in the mobility such as autonomous driving and advanced sensor industries. In order to utilize an advanced driver assistance system (ADAS) and sensor development, it may be necessary to classify objects (such as people, vehicles, street trees, lanes, and the like). In some implementations, ground truth (GT) labeling may be required for verification. For example, for autonomous driving, object recognition technology may be needed to detect people, signals, and other vehicles. To construct an object recognizer, a set of learning data labeled with the shape and type of each object may be required. In some implementations, for example, all images or videos may need to be analyzed and interpreted in advance to identify objects, and such a process is commonly referred to as GT labeling. Labeled data may also be used as an evaluation standard for ADAS and autonomous driving algorithms.

The 3D GT may obtain data by using a lidar. In order to obtain 3D GT using two sensors, for example, a camera and a lidar, synchronization (sync.) consistency of the data obtained by the two sensors is an important issue.

However, because the lidar sensor is a rotating sensor, it may be difficult to synchronize data from 0 degrees and 360 degrees with camera images. In particular, when the dimension of a target object is small or the relative speed of the target object is large, it is more difficult to synchronize the data from the lidar sensor with the camera images.

Descriptions in this background section are provided to enhance understanding of the background of the disclosure, and include descriptions other than those of the prior art already known to those of ordinary skill in the art to which this technology belongs.

SUMMARY

The following summary presents a simplified summary of certain features. The summary is not an extensive overview and is not intended to identify key or critical elements.

An aspect of the present disclosure provides a method and an apparatus for generating three-dimensional (3D) ground truth (GT) capable of generating high quality 3D GT by adjusting (e.g., correcting) the synchronization of data obtained by a lidar and a camera.

Another aspect of the present disclosure provides a method and an apparatus for generating a 3D GT capable of generating high quality 3D GT by adjusting the synchronization of data obtained by a lidar and a camera by using 2D GT.

Still another aspect of the present disclosure provides a method and an apparatus for generating a 3D GT capable of generating high quality 3D GT by comparing a 2D box as a result of projecting obtained 3D GT with the box of 2D GT and correcting the 3D GT.

Still another aspect of the present disclosure provides a method and an apparatus for generating a 3D GT capable of quickly generating high quality 3D GT.

The technical problems to be solved by the present disclosure are not limited to the aforementioned problems, and any other technical problems not mentioned herein will be clearly understood from the following description by those skilled in the art to which the present disclosure pertains.

An apparatus may comprise: one or more processors; and memory storing instructions that, when executed by the one or more processors, cause the apparatus to: obtain, based on sensing information of a sensor, three-dimensional (3D) ground truth (GT) of a target object; obtain a two-dimensional (2D) box for the obtained 3D GT by projecting the obtained 3D GT onto a 2D plane; compare the 2D box with a box of a 2D GT that corresponds to the target object and that is obtained based on sensing information of a camera; generate, based on comparing the 2D box with the box of the 2D GT, an adjusted 3D GT for the target object by adjusting the obtained 3D GT; and output a signal indicating the adjusted 3D GT.

The instructions, when executed by the one or more processors, may cause the apparatus to generate the adjusted 3D GT by minimizing a difference between vertices of the 2D box and vertices of the box of the 2D GT.

The instructions, when executed by the one or more processors, may cause the apparatus to: obtain a plurality of 3D GTs by reflecting a preset initial error value in the obtained 3D GT; obtain a 2D box for each of the plurality of 3D GTs; and generate, as the adjusted 3D GT, one 3D GT in which a difference between vertices of one of the 2D boxes for the plurality of 3D GTs and vertices of the box of the 2D GT is minimized.

The instructions, when executed by the one or more processors, may cause the apparatus to: obtain a plurality of other 3D GTs by reflecting a first error value to the one 3D GT after changing the initial error value to the first error value that is smaller than the initial error value based on the one 3D GT; obtain the 2D boxes for the plurality of other 3D GTs; and generate, as the adjusted 3D GT, another 3D GT in which differences between vertices of one of the 2D boxes for the plurality of other 3D GTs and the vertices of the box of the 2D GT is minimized.

The instructions, when executed by the one or more processors, may cause the apparatus to obtain the 2D box and generate the adjusted 3D GT a specified number of iterations to generate the adjusted 3D GT.

At least one of the initial error value or the first error value may be determined based on a distance from the target object.

The instructions, when executed by the one or more processors, may cause the apparatus to obtain the 2D box by projecting the obtained 3D GT onto the 2D plane in a form of a cuboid.

The instructions, when executed by the one or more processors, may cause the apparatus to obtain the 2D box by changing the obtained 3D GT into coordinate information in a 2D coordinate system for eight vertices of the cuboid and projecting the coordinate information for the eight vertices onto an image.

The instructions, when executed by the one or more processors, may cause the apparatus to: determine, based on the adjusted 3D GT, a location of the target object; and generate, based on the location of the target object, a signal for a vehicle.

The instructions, when executed by the one or more processors, may cause the apparatus to: control, based on at least one of the adjusted 3D GT or the location of the target object, autonomous driving of the vehicle.

A method may comprise: obtaining, by a processor and based on sensing information of a sensor, three-dimensional (3D) ground truth (GT) of a target object; obtaining, by the processor, a two-dimensional (2D) box for the obtained 3D GT by projecting the obtained 3D GT onto a 2D plane; comparing, by the processor, the 2D box with a box of a 2D GT that corresponds to the target object and that is obtained based on sensing information of a camera; generating, by the processor and based on the comparing, an adjusted 3D GT for the target object by adjusting the obtained 3D GT; and outputting a signal indicating the adjusted 3D GT.

The method may further perform one or more operations described herein.

These and other features and advantages are described in greater detail below. The features briefly summarized above with respect to the present disclosure are merely exemplary aspects of the detailed description of the present disclosure described below and do not limit the scope of the present disclosure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
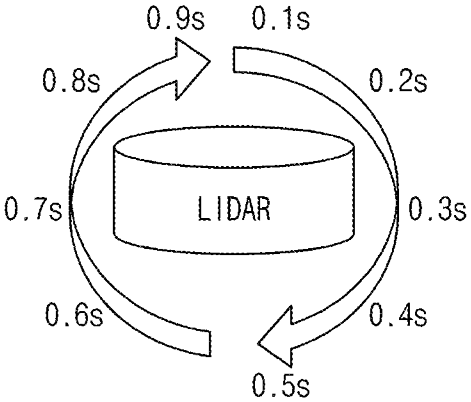
FIG. 1 is a diagram illustrating a synchronization problem between a lidar and a camera.

Hereinafter, various examples of the inventive concept will be described in detail with reference to the accompanying drawings, so that those skilled in the art can easily carry out the inventive concept. However, the inventive concept is not limited to the examples set forth herein and may be modified variously in many different forms.

In describing the examples of the present specification, when a specific description of the related art is deemed to obscure the subject matter of the features of the present specification, the detailed description will be omitted. In the drawings, the portions irrelevant to the description will not be shown in order to make the present disclosure clear.

It will be understood that when an element is referred to as being "connected" or "coupled" to another element, it may be directly connected or indirectly connected to another element. In addition, when some part 'includes' or "has" some elements, unless explicitly described to the contrary, it means that other elements may be further included but not excluded.

Expressions such as "first," or "second," and the like, may express their elements regardless of their priority or importance and may be used to distinguish one element from another element but is not limited to these components. Therefore, without departing from the scope of the present disclosure, a first component of one example may be referred to as a second component of another example. Similarly, a second component of one example may be referred to as a first component of another example.

In the present disclosure, components that are distinguished from each other are only for clearly describing characteristics, and do not mean that the components are necessarily separated. That is, a plurality of components may be integrated to form a single hardware or software unit, or a single component may be distributed to form a plurality of hardware or software units. Accordingly, such integrated or distributed components/elements are included in the scope of the present disclosure, even though not mentioned separately.

In the present disclosure, components described in the present disclosure do not necessarily mean essential components, and some may be optional components. Therefore, an implementation composed of a subset of components described in an exemplary implementation is also included in the scope of the present disclosure. In addition, one or more implementations including other components in addition to the components described in various examples are also included in the scope of the present disclosure.

In the present disclosure, expressions of positional relationships used herein, such as upper, lower, left, right, and the like, are described for convenience of description. When viewing the drawings shown in this specification in reverse, the positional relationship described in the specification may be interpreted in the opposite manner.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

In order to generate 3D GT using two sensors, for example, a lidar and a camera, it may be important to synchronize the camera and the lidar. In this case, as shown in FIG. 1, because a lidar is a physically rotating sensor, it may be difficult to match the data from the 0 degree and 360 degree viewpoints with the camera image. For example, as shown in FIG. 1, lidar data of 0.9 s may be synchronized with a camera image, but lidar data of 0.1 s may not be synchronized with a camera image.

According to the present disclosure, 2D GT obtained through a camera may be used to adjust (e.g., correct) 3D GT of a target object obtained through a lidar, such that lidar data is synchronized with camera data, thereby generating high-quality 3D GT for the target object.

According to the present disclosure, a 2D box for a lidar may be obtained by projecting 3D GT of a target object obtained through the lidar onto a 2D plane in a form of a cuboid, and the obtained 2D box may be compared with a box of 2D GT obtained through a camera, such that lidar data is synchronized with camera data, thereby generating a 3D GT of the synchronized or adjusted target object through the synchronization.

According to the present disclosure, the 2D box may be adjusted to minimize the difference between the vertices of the 2D box projected to a coordinate system (e.g., the world coordinate system) and the vertices of the 2D GT box, thereby generating the final 3D GT for a target object. In this case, an operation of minimizing the difference between vertices of the present disclosure may be repeated a specified number of times, and an operation of minimizing the difference by using various objective functions may be repeated a specified number of times.

A method and apparatus for generating a 3D GT according to the present disclosure will be described with reference to FIGS. 1 to 7.

Figure 2:
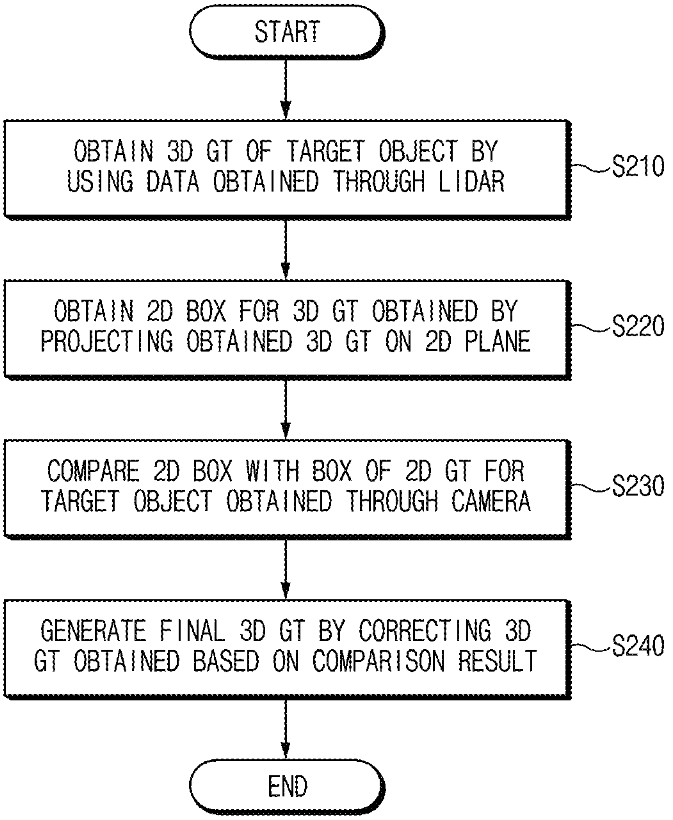
FIG. 2 is a flowchart illustrating a method of generating a 3D GT.

FIG. 2 is a flowchart illustrating a method of generating a 3D GT according to the present disclosure, which illustrates operations performed by an apparatus for generating a 3D GT.

Referring to FIG. 2, a method of generating a 3D GT includes S210 of obtaining 3D GT of a target object by using lidar data on the target object obtained through a lidar and obtaining 2D GT of the target object by using image data on the target object obtained through a camera.

In this case, in S210, the 3D GT obtained by the lidar may be 3D GT of the lidar coordinate system, the 2D GT obtained by the camera may be 2D GT of the world coordinate system, and the 2D GT obtained by the camera may be accurately labeled 2D GT because the 2D GT is GT obtained from an image.

A method according to an example of the present disclosure is provided to solve a synchronization problem that occurs when the 3D GT moves to the world coordinate system in order to generate the final 3D GT by using the 3D GT obtained by a lidar and the 2D GT obtained by the camera, and use accurately labeled 2D GT obtained by a camera.

Figure 3:
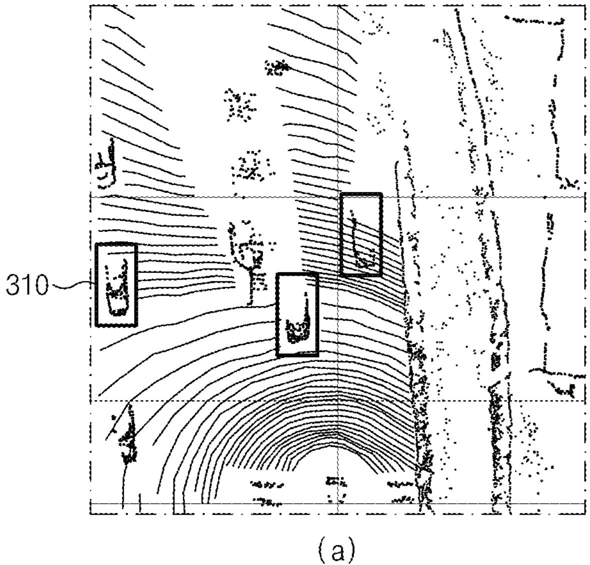
FIG. 3 shows diagrams illustrating a 3D GT and a 2D GT obtained through a sensor.
Figure 3:
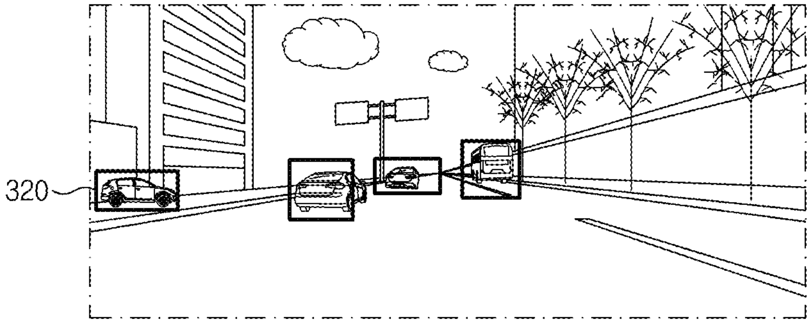

For example, in S210, the lidar data may be used to obtain 3D GT 310 of the lidar coordinate system for the target object as shown in part (a) of FIG. 3, and image data obtained by a camera may be used to obtain 2D GT 320 of the world coordinate system for the target object as shown in part (b) of FIG. 3.

If the 3D GT of the lidar and the 2D GT of the camera are obtained in S210, in S220, the 3D GT of the lidar may be projected onto a 2D plane of the world coordinate system to obtain the 2D box for the 3D GT of the lidar in S220.

In this case, because the 3D GT of lidar is a lidar coordinate system and includes the coordinates (x, y, z), width, height and length of the center point of the target object, in S220, by changing the 3D GT of the lidar coordinate system for the target object to the world coordinate system in a cuboid form, 8 vertices may be projected onto the image to obtain the 2D box for 3D GT in the world coordinate system. For example, in S220, the coordinates (x, y, z), width, height and length may be converted to coordinate information of (x0, y0, z0), (x1, y1, z1), . . . , (x7, y7, z7) for eight vertices, and by projecting such converted coordinate information onto the image, the 2D box may be obtained.

Figure 4:
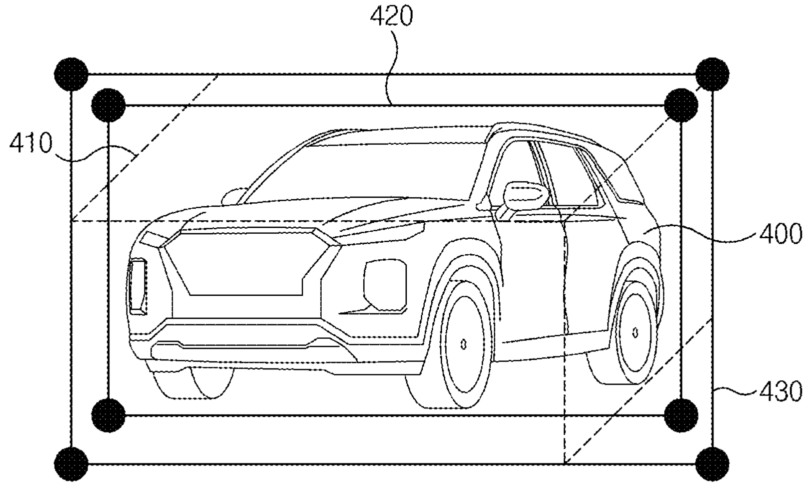
FIG. 4 is a diagram illustrating an operation of comparing a 3D GT obtained through a lidar with a 2D GT obtained through a camera.

For example, in S220, as shown in FIG. 4, cuboid-shaped 3D GT 410 changed to the world coordinate system for a target object 400 may be projected onto the image, thereby generating a 2D box 430 for the 3D GT 410.

If the 2D box in the world coordinate system is obtained in S220, the 2D box for the 3D GT obtained by the lidar is compared with the 2D GT box obtained by the camera, and the 3D GT is adjusted (e.g., corrected) based on the result of comparing two boxes, thereby generating the final 3D GT in S230 and S240.

In an example, as shown in FIG. 4, the vertex of the 2D box 430 for the 3D GT 410 may be compared with the vertex of the 2D GT box 420 obtained by the camera in S230, and in S240, the final 3D GT may be generated using an approximation or optimization technique that minimizes the difference between the vertices of the two boxes 420 and 430.

In this case, operations S220 to S240 may be repeated a specified number of times to generate a high-quality final 3D GT.

In an example, in S220 to $240, two boxes may be compared with each other by using at least one of the rule based method, Newton/Newton-Raphson method and Euler method, and the 3D GT may be adjusted to minimize the difference between the four vertices of the two boxes, thereby generating the final 3D GT for the target object.

The objective function for the approximation technique for generating the final 3-dimensional GT in S240 may include three variables of x, y and z to adjust the 3D GT. However, in view of the vehicle's movement characteristics, because a problem generally occurs with respect to only variable x (e.g., variable x, which is the traveling direction of the vehicle, is the main variable), the objective function may be defined as a function for variable x.

Figure 5:
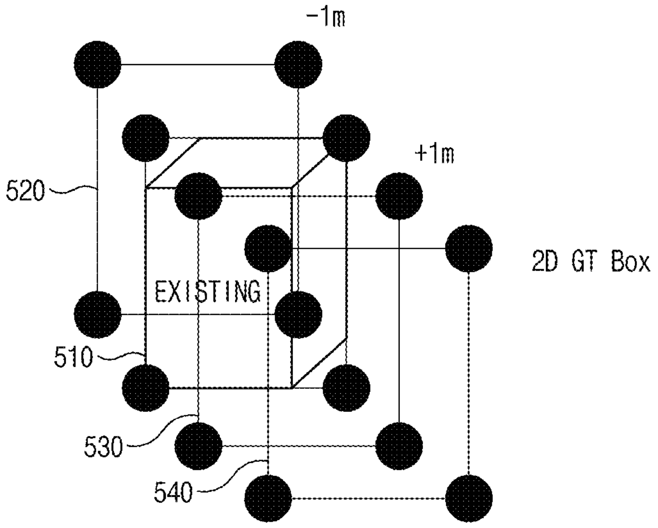
FIG. 5 is a diagram illustrating an operation of generating a final 3D GT by the rule based method.

Describing an operation of generating the final 3D GT using the rule based method with reference to FIG. 5, a plurality of 3D GTs are obtained by reflecting an initial error value, for example, an initial error value of 1 m preset in the 3D GT obtained for the target object using lidar data, and a 2D box is obtained for each 3D GT. For example, as shown in FIG. 5, when t (x-axis, y-axis, z-axis) of the obtained 3D GT is (5 m, 2 m, 1 m), after generating the 3D GTs, that is, (6 m, 2 m, 1 m) and (4 m, 2 m, 1 m) for the 3D GT for the initial error values of +1 m and −1 m (e.g., a maximum error value of 1 m), and after projecting three 3D GTs onto the image in a cuboid shape, the 2D box with minimum and maximum values, for example, a 2D box 510 of the obtained 3D GT (existing 3D GT), a 2D box 530 of 3D GT for +1 m and a 2D box 520 of the 3D GT for −1 m are generated or obtained. Then, a loss L1 between each of the 2D boxes 510, 520 and 530 and a 2D GT box 540, that is, the loss L1 is calculated with four vertices of each of the 2D boxes 510, 520 and 530 and the 2D GT box 540 such that the 3D GT with the lowest loss L1 is determined as new 3D GT. When the new 3D GT is determined, the initial error value is changed to a first error value smaller than the initial error value, for example, 50% (0.5 m) of the previous error value, and the first error value of 0.5 m (+0.5 m, −0.5 m) is reflected in the new 3D GT to generate a plurality of new 3D GTs based on the new 3D GT, and then a 2D box is generated for each of the plurality of new 3D GTs. Then, by calculating the loss L1 between the newly generated 2D box and the 2D GT, the 3D GT with the lowest loss L1 is again determined as the new 3D GT. By repeating the above-described process a specified number of times (e.g., after reducing the maximum error value to 0.25 m, 0.125 m, etc.), the final 3D GT for the target object may be generated.

In an example, the method of the present disclosure may determine the initial error value and the first error value based on the distance to the target object in the rule-based method. For example, in the method of the present disclosure, the initial error value may be set larger or smaller than 1 m depending on the distance to the target object, and a scheme of changing from the initial error value to the first error value may determine the initial error value differently by reflecting the distance to the target object other than 50% of the previous error value. In another example, if the initial error value, the first error value, the second error value, and the third error value are sequentially changed, the method of the present disclosure changes the initial error value to the second or third error value other than the first error value according to the distance to the target object, and may change the number of repetitions. Of course, the change method may be determined by an individual or business operator providing the technology of the present disclosure.

Figure 6:
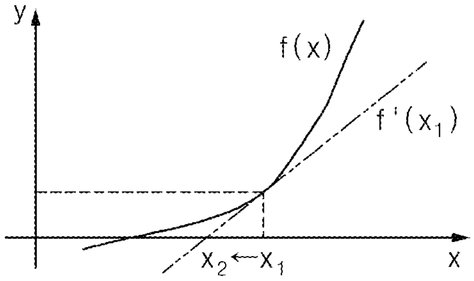
FIG. 6 shows graphs illustrating an operation of generating a final 3D GT by the Newton-Raphson method and the Euler method.
Figure 6:
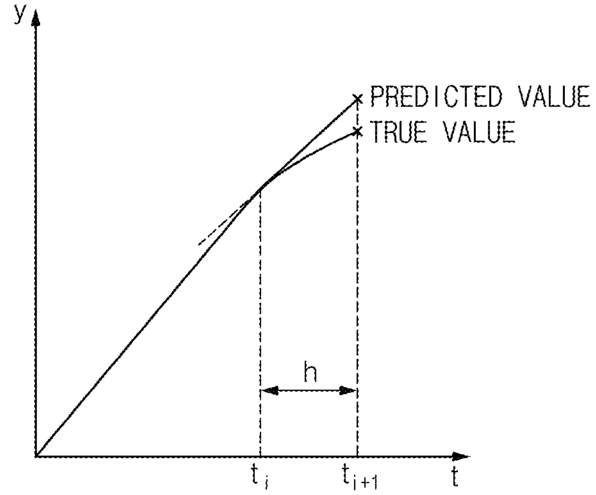

An operation of generating the final 3D GT by using the Newton/Newton-Raphson method (part (a) of FIG. 6) and the Euler method (part (b) of FIG. 6) will be described with reference to FIG. 6, the equation f(x) for each technique is generated using a projection matrix and four vertices of the 2D GT, and the solution of f(x) is approximated with each technique. In this case, $f(x)=(u1-u1')+(v1-v1')+ \ldots (u4-u4')=0$, u1 to u4 may refer to x-axis coordinate values of the four vertices of the 2D box and u1' to u4' may refer to x-axis coordinate values of the four vertices of the 2D GT box, and x may be the center value x. 'f(x)' may include an equation to approximate the solution with Newton's laws and/or Euler's laws.

The initial value may use the center value 'x' of the previously obtained 3D GT, and the final GT may be generated by approximating the solution of f(x). Because approximating the solution of f(x) may converge quickly by changing the value significantly when the difference between the 3D cuboid and the 2D GT is large, and changing the value slowly when the difference is small, it may converge faster than simply changing the value little by little. Therefore, the final 3D GT for the target object may be quickly generated. The Newton/Newton-Raphson method and the Euler method may be repeated a specified number of times, for example, three times, to generate the final three-dimensional GT. Because the Newton/Newton-Raphson method and the Euler method are known to those skilled in the art, the detailed description will be omitted.

As described above, a method of generating a 3D GT according to the present disclosure may generate a high-quality 3D GT by adjusting the synchronization of data obtained through a lidar and a camera.

A method of generating a 3D GT according to the present disclosure may adjust the 3D GT of the target object obtained through a lidar by using the 2D GT obtained through a camera, thereby generating a high-quality 3D GT.

A method of generating a 3D GT according to the present disclosure may compare the 2D box obtained by projecting the 3D GT obtained through a lidar into the world coordinate system in a cuboid shape with the 2D GT box obtained through a camera to adjust the 3D GT, thereby generating a high-quality 3D GT.

A method of generating a 3D GT according to the present disclosure may adjust the synchronization problem caused by moving the 3D GT obtained through a lidar to the world coordinate system through the 2D GT obtained by a camera and repeat the adjustment operation a specified number of times using an approximation technique, thereby generating a high-quality 3D GT.

Figure 7:
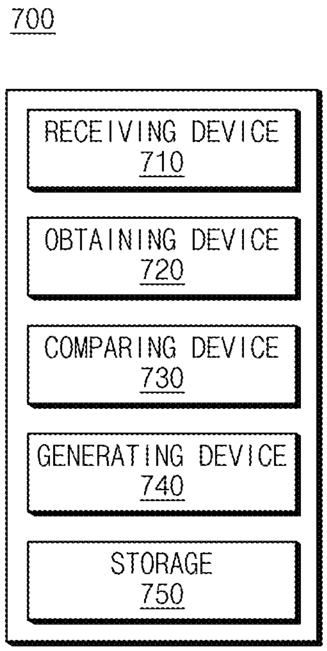
FIG. 7 is a block diagram illustrating an apparatus for generating a 3D GT.

FIG. 7 is a block diagram illustrating an apparatus for generating a 3D GT, which illustrates an apparatus that performs the methods of FIGS. 1 to 6.

Referring to FIG. 7, an apparatus 700 for generating a 3D GT may include a receiving device 710, an obtaining device 720, a comparing device 730, a generating device 740, and storage 750. One or more of the receiving device 710, an obtaining device 720, a comparing device 730, and/or a generating device 740 may be implemented by one or more processors. At least part of the receiving device 710 and/or an obtaining device 720 may be implemented by one or more communication interfaces and/or sensors.

The storage 750, which may be a component that stores all or part of data related to the technology of the present disclosure, may store data obtained through a lidar, data obtained through a camera, information about a target object, a 3D GT of the target object obtained through the lidar, a 2D GT of the target object obtained through the camera, an algorithm (e.g., an approximation technique algorithm) for generating a final 3D GT, and data on the final 3D GT of the target object.

The receiving device 710 receives the lidar data obtained for the target object from the lidar and receives image data obtained for the target object from the camera.

The obtaining device 720 obtains the 3D GT by using the lidar data obtained through the lidar for the target object, and obtains the 2D GT by using the image data obtained through the camera.

In this case, the 3D GT obtained through the lidar may be a 3D GT of the lidar coordinate system, the 2D GT obtained through the camera may be a 2D GT of the world coordinate system, and because the 2D GT obtained through the camera is obtained from an image, the 2D GT may be accurately labeled.

The obtaining device 720 may obtain the 2D box for the 3D GT of the lidar by projecting the 3D GT of the lidar onto the 2D plane of the world coordinate system.

In this case, because the 3D GT of the lidar is in the lidar coordinate system and includes the coordinates (x, y, z), width, height and length of the center point of the target object, the obtaining device 720 may change the 3D GT of the world coordinate system to the 3D GT of the cuboid-shaped world coordinate system, so that it is possible to obtain the 2D box for the 3D GT in the world coordinate system by projecting 8 vertices onto the image.

According to an example, when generating the final 3D GT using the rule based method, the obtaining device 720 may reflect the initial error value preset in the 3D GT to obtain a plurality of 3D GTs, and obtain a 2D box for each of the plurality of 3D GTs.

According to an example, in order to generate the final 3D GT, when any one 3D GT among the plurality of 3D GTs is determined by the generating device, after changing the initial error value to the first error value less than the initial error value based on any one 3D GT, the obtaining device 720 may reflect the first error value in one 3D GT to obtain a plurality of other 3D GTs and obtain the 2D box for each of the plurality of other 3D GTs.

In this case, the initial error value and the first error value may be determined considering the distance from the target object, and the number of repetitions may also be determined considering the distance from the target object.

The comparing device 730 compares the 2D box for the 3D GT obtained by lidar with the 2D GT box obtained by the camera.

According to an example, the comparing device 730 may compare four vertices of a 2D box with four vertices of a 2D GT box.

According to an example, when the plurality of 2D boxes are obtained by the obtaining device 720, the comparing device 730 may compare each of the plurality of 2D boxes with the 2D GT box, and provide the comparison results to the generating device 740.

The generating device 740 generates the final 3D GT for the target object by correcting the 3D GT obtained for the target object based on the comparison result by the comparing device 730.

According to an example, the generating device 740 may generate the final 3D GT for the target object by using an approximation or optimization technique that minimizes the difference between the vertices of the two boxes compared by the comparing device 730.

In this case, the generating device 740 may adjust the 3D GT of the target object to minimize the differences between four vertices of two boxes by using at least one of the rule based method, Newton/Newton-Raphson method, and Euler method, thereby generating the final 3D GT for the target object As an example, when generating the final 3D GT by using the rule base method, the generating device 740 may generate another 3D GT as the final 3D GT based on the comparison result by the comparing device 730, in which the differences between the vertices of the 2D box for each of the plurality of other 3D GTs and the vertices of the box of the 2D GT are minimized. In this case, the generating device may repeat the operation a specified number of times to generate one 3D GT that minimizes the loss L1 by the comparing device as the final 3D GT.

Although the repeated description is omitted in a device according to another example of the present disclosure with reference to FIG. 7, the device according to another example of the present disclosure may include all the contents described in the methods of FIGS. 1 to 6.

According to an aspect of the present disclosure, a method of generating three-dimensional (3D) ground truth (GT) includes obtaining 3D GT of a target object by using data obtained by a lidar, obtaining a two-dimensional (2D) box for the obtained 3D GT by projecting the obtained 3D GT onto a 2D plane, comparing the 2D box with a box of a 2D GT for the target object obtained by a camera, and generating a final 3D GT for the target object by correcting the obtained 3D GT based on a comparison result.

According to an example, the generating of the final 3D GT may include generating the final 3D GT by correcting the obtained 3D GT by minimizing a difference between vertices of the 2D box and vertices of the box of the 2D GT.

According to an example, the obtaining of the 2D box may include obtaining a plurality of 3D GTs by reflecting a preset initial error value in the obtained 3D GT, and obtaining the 2D box for each of the plurality of 3D GTs, and the generating of the final 3D GT may include generating, as the final 3D GT, one 3D GT in which a difference between vertices of the 2D box for each of the plurality of 3D GTs and vertices of the box of the 2D GT is minimized.

According to an example, the obtaining of the 2D box may include obtaining a plurality of other 3D GTs by reflecting a first error value to the one 3D GT after changing the initial error value to the first error value smaller than the initial error value based on the one 3D GT, and obtaining the 2D box for each of the plurality of other 3D GTs, and the generating of the final 3D GT may include generating, as the final 3D GT, another 3D GT in which differences between vertices of the 2D box for each of the plurality of other 3D GTs and the vertices of the box of the 2D GT is minimized.

According to an example, the obtaining of the 2D box and the generating of the final 3D GT may be performed a specified number of iterations to generate the final 3D GT.

According to an example, at least one of the initial error value and the first error value may be determined based on a distance from the target object.

According to an example, the obtaining of the 2D box may include obtaining the 2D box by projecting the obtained 3D GT onto the 2D plane in a form of a cuboid.

According to an example, the obtaining of the 2D box may include obtaining the 2D box by changing the obtained 3D GT into coordinate information in a world coordinate system for eight vertices of the cuboid and projecting the coordinate information for the eight vertices onto an image.

According to another aspect of the present disclosure, an apparatus for generating three-dimensional (3D) ground truth (GT) includes an obtaining device that obtains 3D GT of a target object by using data obtained by a lidar, and obtains a two-dimensional (2D) box for the obtained 3D GT by projecting the obtained 3D GT onto a 2D plane, a comparing device that compares the 2D box with a box of a 2D GT for the target object obtained through a camera, and a generating device that generates a final 3D GT for the target object by correcting the obtained 3D GT based on a comparison result.

According to an example, the generating device may generate the final 3D GT by correcting the obtained 3D GT by minimizing a difference between vertices of the 2D box and the of the box of the 2D GT.

According to an example, the obtaining device may obtain a plurality of 3D GTs by reflecting a preset initial error value in the obtained 3D GT, and obtain the 2D box for each of the plurality of 3D GTs, and the generating device may generate, as the final 3D GT, one 3D GT in which a difference between vertices of the 2D box for each of the plurality of 3D GTs and vertices of the box of the 2D GT is minimized.

According to an example, the obtaining device may obtain a plurality of other 3D GTs by reflecting a first error value to the one 3D GT after changing the initial error value to the first error value smaller than the initial error value based on the one 3D GT, and obtain the 2D box for each of the plurality of other 3D GTs, and the generating device may generate, as the final 3D GT, another 3D GT in which differences between vertices of the 2D box for each of the plurality of other 3D GTs and the vertices of the box of the 2D GT is minimized.

According to an example, the obtaining device and the generating device may obtain the 2D box and generate the final 3D GT a specified number of iterations to generate the final 3D GT.

According to an example, at least one of the initial error value and the first error value may be determined based on a distance from the target object.

According to an example, the obtaining device may obtain the 2D box by projecting the obtained 3D GT onto the 2D plane in a form of a cuboid.

According to an example, the obtaining device may obtain the 2D box by changing the obtained 3D GT into coordinate information in a world coordinate system for eight vertices of the cuboid and projecting the coordinate information for the eight vertices onto an image.

Figure 8:
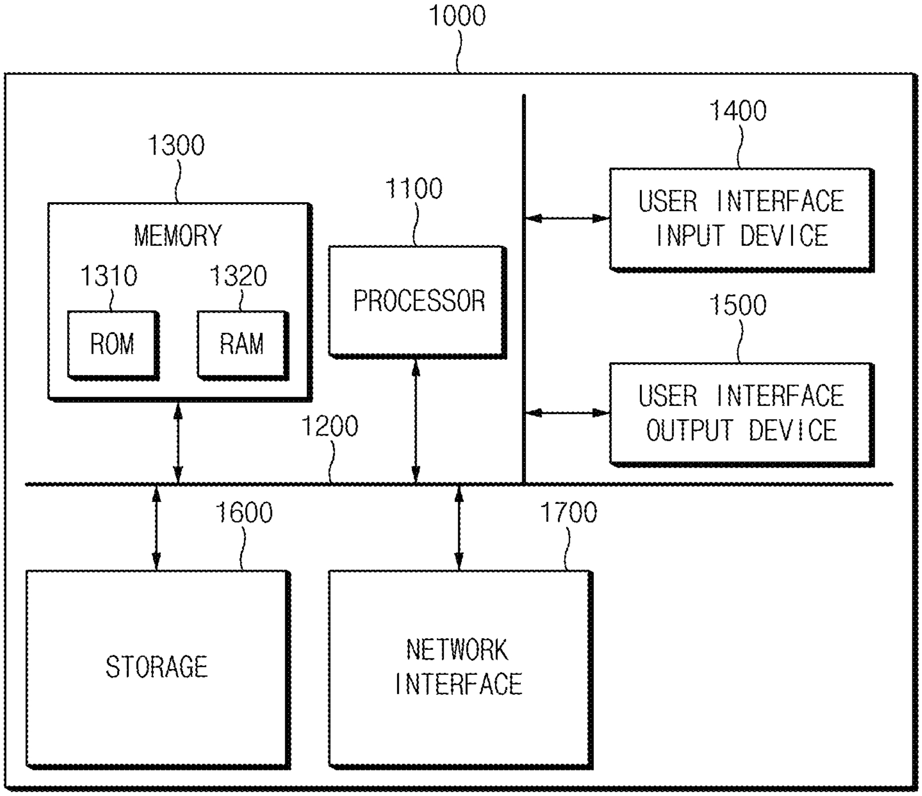
FIG. 8 is a block diagram illustrating a computing system for executing a method of generating a 3D GT.

FIG. 8 is a block diagram illustrating a computing system for executing a method of generating a 3D GT.

Referring to FIG. 8, a method of generating a 3D GT described above may be implemented through a computing system 1000. The computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiment(s) of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

According to one or more aspects of the present disclosure, it is possible to generate a high-quality 3D GT by correcting the synchronization of data obtained through a lidar and a camera.

According to one or more aspects of the present disclosure, it is possible to generate a high-quality 3D GT by correcting the synchronization of data obtained through by a lidar and a camera by using a 2D GT.

According to one or more aspects of the present disclosure, it is possible to generate a high-quality 3D GT by comparing the 2D box resulting from the projection of the obtained 3D GT with the box of the 2D GT and correcting the 3D GT.

According to one or more aspects of the present disclosure, it is possible to quickly generate a high-quality 3D GT by correcting the synchronization problem, which is caused by converting the 3D GT obtained through a lidar to that in the world coordinate system, with the 2D GT obtained through a camera, and repeating the correcting operation a specified number of times.

Effects obtained by various features of the disclosure may not be limited to the above, and other effects will be clearly understandable to those having ordinary skill in the art from the following disclosures.

Although various examples of the present disclosure have been described for illustrative purposes, those skilled in the art will appreciate that various modifications, additions and substitutions are possible, without departing from the scope and spirit of the disclosure. Therefore, the exemplary embodiment(s) disclosed in the present disclosure are provided for the sake of descriptions, not limiting the technical concepts of the present disclosure, and it should be understood that such exemplary embodiment(s) are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A method comprising:

obtaining, by a processor and based on sensing information of a sensor, three-dimensional (3D) ground truth (GT) of a target object;

obtaining, by the processor, a two-dimensional (2D) box for the obtained 3D GT by projecting the obtained 3D GT onto a 2D plane, wherein the obtaining of the 2D box comprises:

obtaining a plurality of 3D GTs by reflecting an initial error value in the obtained 3D GT, and obtaining a 2D box for each of the plurality of 3D GTs;

obtaining a plurality of other 3D GTs by reflecting a first error value to one 3D GT selected from the plurality of 3D GTs after changing the initial error value to the first error value that is smaller than the initial error value; and obtaining the 2D boxes for the plurality of other 3D GTs;

comparing, by the processor, the 2D box with a box of a 2D GT that corresponds to the target object and that is obtained based on sensing information of a camera;

generating, by the processor and based on the comparing, an adjusted 3D GT for the target object by adjusting the obtained 3D GT; and outputting a signal indicating the adjusted 3D GT.

2. The method of claim 1, wherein the generating of the adjusted 3D GT comprises minimizing a difference between vertices of the 2D box and vertices of the box of the 2D GT.

3. The method of claim 1, wherein the generating of the adjusted 3D GT comprises generating, as the adjusted 3D GT, one 3D GT in which a difference between vertices of one of the 2D boxes for the plurality of 3D GTs and vertices of the box of the 2D GT is minimized.

4. The method of claim 3, wherein the generating of the adjusted 3D GT comprises generating, as the adjusted 3D GT, another 3D GT in which differences between vertices of one of the 2D boxes for the plurality of other 3D GTs and the vertices of the box of the 2D GT is minimized.

5. The method of claim 4, wherein the obtaining of the 2D box and the generating of the adjusted 3D GT are performed a specified number of iterations to generate the adjusted 3D GT.

6. The method of claim 4, wherein at least one of the initial error value or the first error value is determined based on a distance from the target object.

7. The method of claim 1, wherein the obtaining of the 2D box comprises obtaining the 2D box by projecting the obtained 3D GT onto the 2D plane in a form of a cuboid.

8. The method of claim 7, wherein the obtaining of the 2D box comprises obtaining the 2D box by changing the obtained 3D GT into coordinate information in a 2D coordinate system for eight vertices of the cuboid and projecting the coordinate information for the eight vertices onto an image.

9. The method of claim 1, further comprising:

determining, based on the adjusted 3D GT, a location of the target object; and generating, based on the location of the target object, a signal for a vehicle.

10. An apparatus comprising:

one or more processors; and memory storing instructions that, when executed by the one or more processors, cause the apparatus to:

obtain, based on sensing information of a sensor, three-dimensional (3D GT ) ground truth (GT) of a target object;

obtain a two-dimensional (2D ) box for the obtained 3D GT by projecting the obtained 3D GT onto a 2D plane;

compare the 2D box with a box of a 2D GT that corresponds to the target object and that is obtained based on sensing information of a camera;

generate, based on comparing the 2D box with the box of the 2D GT, an adjusted 3D GT for the target object by adjusting the obtained 3D GT; and output a signal indicating the adjusted 3D GT, wherein the instructions, when executed by the one or more processors, further cause the apparatus to:

obtain a plurality of 3D GTs by reflecting an initial error value in the obtained 3D GT;

obtain a 2D box for each of the plurality of 3D GTs;

obtain a plurality of other 3D GTs by reflecting a first error value to one 3D GT selected from the plurality of 3D GTs after changing the initial error value to the first error value that is smaller than the initial error value; and obtain the 2D boxes for the plurality of other 3D GTs.

11. The apparatus of claim 10, wherein the instructions, when executed by the one or more processors, cause the apparatus to generate the adjusted 3D GT by minimizing a difference between vertices of the 2D box and vertices of the box of the 2D GT.

12. The apparatus of claim 10, wherein the instructions, when executed by the one or more processors, cause the apparatus to:

generate, as the adjusted 3D GT, one 3D GT in which a difference between vertices of one of the 2D boxes for the plurality of 3D GTs and vertices of the box of the 2D GT is minimized.

13. The apparatus of claim 12, wherein the instructions, when executed by the one or more processors, cause the apparatus to:

generate, as the adjusted 3D GT, another 3D GT in which differences between vertices of one of the 2D boxes for the plurality of other 3D GTs and the vertices of the box of the 2D GT is minimized.

14. The apparatus of claim 13, wherein the instructions, when executed by the one or more processors, cause the apparatus to obtain the 2D box and generate the adjusted 3D GT a specified number of iterations to generate the adjusted 3D GT.

15. The apparatus of claim 13, wherein at least one of the initial error value or the first error value is determined based on a distance from the target object.

16. The apparatus of claim 10, wherein the instructions, when executed by the one or more processors, cause the apparatus to obtain the 2D box by projecting the obtained 3D GT onto the 2D plane in a form of a cuboid.

17. The apparatus of claim 16, wherein the instructions, when executed by the one or more processors, cause the apparatus to obtain the 2D box by changing the obtained 3D GT into coordinate information in a 2D coordinate system for eight vertices of the cuboid and projecting the coordinate information for the eight vertices onto an image.

18. The apparatus of claim 10, wherein the instructions, when executed by the one or more processors, cause the apparatus to:

determine, based on the adjusted 3D GT, a location of the target object; and generate, based on the location of the target object, a signal for a vehicle.

19. A vehicle comprising:

a camera;

a sensor configured to obtain sensing information representing three-dimensional (3D GT) data points during a driving operation of the vehicle, wherein the 3D GT data points correspond to a target object in a surrounding environment of the vehicle;

one or more processors; and memory storing instructions that, when executed by the one or more processors, cause the vehicle to:

obtain, based on the sensing information obtained during the driving operation of the vehicle, 3D GT ground truth (GT) of the target object;

obtain a two-dimensional (2D ) box for the obtained 3D GT by projecting the obtained 3D GT onto a 2D plane;

compare the 2D box with a box of a 2D GT that corresponds to the target object and that is obtained based on sensing information of the camera;

generate, based on comparing the 2D box with the box of the 2D GT, an adjusted 3D GT for the target object by adjusting the obtained 3D GT to reduce at least one error associated with the obtained 3D GT; and output a signal indicating the adjusted 3D GT.

20. The vehicle of claim 19, wherein the instructions, when executed by the one or more processors, cause the vehicle to control, based on the outputted signal, a driving operation of the vehicle.

* * * * *